(12) United States Patent
Sokolov

(10) Patent No.: US 7,048,380 B2
(45) Date of Patent: May 23, 2006

(54) COLOR SWITCHING PROJECTION APPARATUS WITH TWO LIQUID CRYSTAL PANELS

(75) Inventor: Kirill Sokolov, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/644,097

(22) Filed: Aug. 20, 2003

(65) Prior Publication Data

US 2004/0057019 A1  Mar. 25, 2004

(30) Foreign Application Priority Data

Sep. 13, 2002 (KR) ............... 10-2002-0055639

(51) Int. Cl.
| | |
|---|---|
| G03B 21/14 | (2006.01) |
| G03B 21/20 | (2006.01) |
| G02F 1/1335 | (2006.01) |
| G02F 1/00 | (2006.01) |
| G02B 27/28 | (2006.01) |
| G02B 5/30 | (2006.01) |
| H04N 5/74 | (2006.01) |

(52) U.S. Cl. ..................... 353/20; 353/31; 353/33; 353/34; 353/37; 353/81; 353/82; 353/84; 353/102; 349/8; 349/9; 359/495; 359/502; 359/589; 359/629; 348/742; 348/751; 348/757

(58) Field of Classification Search .............. 353/20, 353/30, 21, 33–34, 37–38, 69, 81, 122, 31, 353/82, 98, 99, 84, 102; 349/5, 8–9, 25, 349/57, 96, 104–105, 114; 359/495, 497, 359/502, 586, 589, 629, 634, 638, 640, 900; 348/742, 751, 757, 761

See application file for complete search history.

(56) References Cited

U.S. PATENT DOCUMENTS

| | | | | |
|---|---|---|---|---|
| 5,221,982 A | * | 6/1993 | Faris ...................... | 349/115 |
| 5,566,367 A | * | 10/1996 | Mitsutake et al. ........ | 359/497 |
| 5,993,007 A | * | 11/1999 | Jung ....................... | 353/34 |
| 6,536,902 B1 | * | 3/2003 | Lee ........................ | 353/20 |
| 2001/0021004 A1 | * | 9/2001 | Yano ...................... | 353/31 |
| 2002/0027619 A1 | | 3/2002 | Robinson et al. ......... | 349/9 |
| 2003/0151833 A1 | * | 8/2003 | Berman et al. .......... | 359/831 |

* cited by examiner

*Primary Examiner*—W. B. Perkey
*Assistant Examiner*—Rochelle Blackman
(74) *Attorney, Agent, or Firm*—Staas & Halsey LLP

(57) ABSTRACT

A projection apparatus including a polarization conversion system to convert light having a first polarization component; a color recycling system, which separates the light into first and second color lights, to transmit and reflect the first and second color lights; an image forming system including a first reflective panel and a second reflective panel, which respectively modulate the first and second color lights, and a third reflective panel, which modulates the third color light; and an optical path conversion system, which splits the optical paths of fourth and fifth color lights incident from the color recycling system such that the first color light in the fourth color light is directed to the first reflective panel, the second color light in the fifth color light is directed to the second reflective panel, and the third color light in the fourth and fifth color light is directed to the third reflective panel.

41 Claims, 10 Drawing Sheets

COLOR SWITCHING PROJECTION APPARATUS WITH TWO LIQUID CRYSTAL PANELS

CROSS-REFERENCE TO RELATED APPLICATIONS

This application claims the priority of Korean Patent Application No. 2002-55639, filed Sep. 13, 2002, in the Korean Intellectual Property Office, the disclosure of which is incorporated herein by reference.

BACKGROUND OF THE INVENTION

1. Field of the Invention

The present invention relates to a projection apparatus with two panels, and more particularly, to a projection apparatus with two liquid crystal panels, which increases light emission efficiency and brightness by employing a color switching system.

2. Description of the Related Art

A projection apparatus with two liquid crystal panels can be manufactured to have the advantages of both a single-panel projection apparatus and a three-panel projection apparatus. The three-panel projection apparatus has an advantage of high light emission efficiency but has a disadvantage of a complex structure due to many optical elements. The single-panel projection apparatus has an advantage of a simple structure but has a disadvantage of low brightness. In particular, since the three-panel projection apparatus transmits more green light than blue and red light, a separate device to remove green light by 40% is additionally required in order to use the three-panel projection apparatus for a display such as a television.

Accordingly, there have been developed projection apparatuses with two liquid crystal panels, which provide the advantages of the single and three-panel apparatuses while also solving their problems. An example of such a projection apparatus with two liquid crystal panels is disclosed in U.S. Patent Publication No. 2002/0027619 A1. This projection system is shown in FIG. 1.

Referring to FIG. 1, P polarized white light 210 is polarized by an achromatic or neutral polarizer 215 and is then sequentially incident on a blue light modulator 220 and a green light modulator 230. The blue and green light modulators 220 and 230 actively modulate blue light and green light, respectively, in response to an analog voltage. Each of the modulators 220 and 230 can be an active stack or any other temporal modulator, which can shift the polarization of blue or green light in response to an applied voltage. Red light is passively changed by a first filter 240 to orthogonal polarization. A neutral analyzer 245 blocks light not changed by the modulators 220, 230.

Light output from the neutral analyzer 245 can be red+blue (i.e., magenta) light, red+green (i.e., yellow) light, red light, or white light. The polarization of the red light is rotated by a second filter 250. In the output light, mixtures with green or blue are separated into green and blue light having orthogonally polarized components by a polarizing beamsplitter 260, and the green and blue light illuminate a green/blue sequential panel 270. The red light is transmitted by the polarizing beamsplitter 260 and illuminates a red panel 280.

Panel pixels that are ON rotate the polarization by $\pi/2$, and this light passes through the polarizing beamsplitter 260 and is directed toward a projection lens 200. In order to avoid leakage of P polarized red light reflected from OFF panel pixels, a red/cyan polarizing filter 290 is further placed on an optical path between the polarizing beamsplitter 260 and the projection lens 200 to rotate the polarization of the red light to S polarization. A clean-up polarizer 295, which absorbs the leakage, is further provided on an optical path of the red/cyan polarizing filter 290, thereby increasing the contrast of an image displayed on a screen 205.

The two panel projection system disclosed in U.S. Patent Publication No. 2002/0027619 A1 uses the green/blue sequential panel 270 so that green and blue images cannot be simultaneously formed. Accordingly, the total amount of light is reduced by $2/3$, decreasing the brightness of an image displayed on the screen 205.

A conventional screen to display an image is shown in FIG. 8A. However, the conventional screen is disadvantageous because it cannot combine yellow and magenta light having different optical paths.

SUMMARY OF THE INVENTION

Accordingly, it is an aspect of the present invention to provide a projection apparatus which can increase light emission efficiency and brightness without reducing the amount of light emitted from a light source.

Additional aspects and/or advantages of the invention will be set forth in part in the description which follows and, in part, will be obvious from the description, or may be learned by practice of the invention.

The foregoing and/or other aspects are achieved by providing a projection apparatus including an illumination system to emit white light having light of a predetermined wavelength band; a polarization conversion system, to convert the light of the predetermined wavelength band to a first polarization component; a color recycling system to separate the light of the predetermined wavelength band into a first color light and a second color light, transmit and reflect the first and second color lights, convert a third color light to have a second polarization component, and transmit the third color light so that a fourth color light, that is a mixture of the first and third color lights, and a fifth color light, that is a mixture of the second and third color lights, progress in different optical paths; an image forming system including a first reflective panel and a second reflective panel, which respectively modulate the first and second color lights according to an applied image signal, and a third reflective panel, which modulates the third color light according to the applied image signal; a screen to receive the first through third color lights modulated by the image forming system and projected thereon and display an image; an optical path conversion system, to split the optical paths of the fourth and fifth color lights incident from the color recycling system such that the first color light in the fourth color light is directed to the first reflective panel, the second color light in the fifth color light is directed to the second reflective panel, and the third color light in the fourth and fifth color lights is directed to the third reflective panel, and directs the first through third color lights reflected from the respective first through third reflective panels to the screen; and a projection system including a projection lens, which projects the fourth color light output from the optical path conversion system and the fifth color light output from the optical path conversion system on the screen.

The illumination system may include a light source, which emits the white light; and a fly-eye lens integrator, which separates the white light emitted from the light source into sub beams.

The illumination system may further include an ultraviolet filter on an optical path between the light source and the fly-eye lens integrator in order to block ultraviolet light in the white light.

The polarization conversion system includes a prism array including a plurality of prisms having interfaces slanting against an optical axis, each of the interfaces being coated with a liquid crystal film, which reflects the first polarization component of the light of the predetermined wavelength band in the white light, and transmits the second polarization component.

In addition, the polarization conversion system may include a blocking mask, which is disposed on the incident surface of every other prism in order to block incident light; and a $\lambda/2$ phase plate, which is disposed on the output surface of each prism having the blocking mask on its incident surface in order to convert the second polarization component of light crossing the prism into the first polarization component.

The interfaces of the plurality of prisms in the prism array slant against the optical axis at an angle of 45 degrees. The liquid crystal film may be a cholesteric film.

The light of the predetermined wavelength band is the first and second color lights, and the liquid crystal film reflects the first polarization components of the first and second color lights and transmits the second polarization components thereof.

The light of the predetermined wavelength band is the first through third color lights, and the liquid crystal film reflects the first polarization components of the first through third color lights and transmits the second polarization components thereof.

The color recycling system includes a color switching filter, a roof mirror, and a third color filter. The color switching filter includes a first cell and a second cell, which include a first color filter and a second color filter stacked in opposite orders. The first color filter reflects the first color light in a power-on state and transmits the first color light in a power-off state, and the second color filter reflects the second color light in the power-on state and transmits the second color light in the power-off state. The first and second filters transmit the third color light. The color switching filter directs the fourth color light output from the first cell and the fifth color light output from the second cell to the image forming system. The roof mirror reflects light incident from the color switching filter back to the color switching filter. The third color filter is positioned on an optical path between the color switching filter and the roof mirror and converts the first polarization component of the third color light reflected from the color switching filter into the second polarization component.

Here, the color recycling system further includes a prism array combiner, which refracts the fourth and fifth color lights incident from the color switching filter so that the fourth and fifth color light progress toward the image forming system along different optical paths.

The color recycling system further includes a passive color filter, which reflects the first polarization component of the third color light and transmits the second polarization component thereof, on its incident surface.

The first through third filters and the passive color filter may be cholesteric filters. The color switching filter may slant against an optical axis at an angle of 45 degrees.

The roof mirror may be disposed below the color switching filter and includes a first mirror parallel with the color switching filter and a second mirror orthogonal to the color switching filter and the first mirror. The third color filter may be disposed on an optical path between the color switching filter and the first mirror.

The projection apparatus may further include a relay lens system, which shapes the fourth and fifth color lights, on an optical path between the color recycling system and the image forming system. The projection apparatus may further include a $\lambda/4$ phase plate on an optical path between the relay lens system and the optical path conversion system. The projection apparatus may further include a chromatic polarizer on an optical path between the $\lambda/4$ phase plate and the image forming system.

The chromatic polarizer may be made of a liquid crystal polymer or a linearly photopolymerizable polymer. The first and second reflective panels may be parallel with each other, and the third reflective panel may be orthogonal to the first and second reflective panels. A shadow zone, in which no pixels exist, may be formed between the first and second reflective panels and at the center of the third reflective panel. Each of the first through third reflective panels may include a $\lambda/4$ phase plate on its incident surface.

The optical path conversion system may include a polarizing beamsplitter having a transmissive/reflective surface, to reflect the first color light in the fourth color light incident from the color recycling system to the first reflective panel, reflect the second color light in the fifth color light to the second reflective panel, transmit the first and second color lights modulated by the respective first and second reflective panels to the projection system, transmit the third color light in the fourth and fifth color lights incident from the color recycling system to the third reflective panel, and reflect the third color light modulated by the third reflective panel.

The projection apparatus may further include a wideband filter to convert the first polarization component of the third color light output from the optical path conversion system into the second polarization component, on an optical path between the optical path conversion system and the projection system.

The projection apparatus may further include a clean-up polarizer, which removes parasitic polarization, on an optical path between the wideband filter and the projection system.

The screen may include a waveguide array, in which a plurality of waveguides slanting against an optical axis at a predetermined angle are symmetrically arranged with respect to the center of the screen in order to refract the fourth and fifth color lights output from the projection system, thereby forming a unified image.

The first color light is blue light, the second color light is green light, the third color light is red light, the fourth color light is cyan light, and the fifth color light is yellow light. The first polarization component is an S polarization component and the second polarization component is a P polarization component. The present invention may include the polarization conversion system and the color recycling system, in order to preserve the amount of light without loss, thereby displaying a high-brightness image on a screen.

BRIEF DESCRIPTION OF THE DRAWINGS

These and/or other aspects and advantages of the invention will become apparent and more readily appreciated from the following description of the preferred embodiment, taken in conjunction with the accompanying drawings of which.

DETAILED DESCRIPTION OF THE PREFERRED EMBODIMENTS

Figure 1:
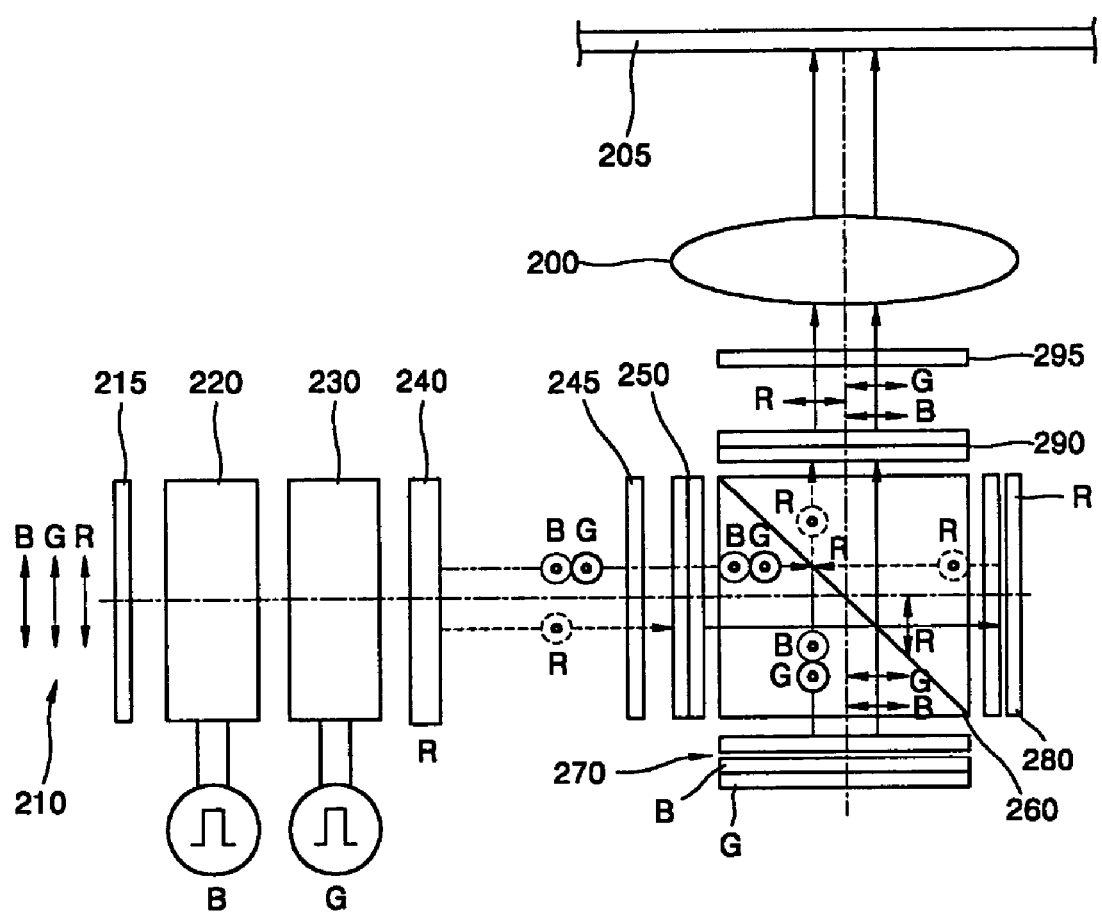
FIG. 1 is a diagram of a conventional two panel projection system.

Reference will now be made in detail to the present preferred embodiment of the present invention, examples of which are illustrated in the accompanying drawings, wherein like reference numerals refer to like elements throughout.

Figure 2:
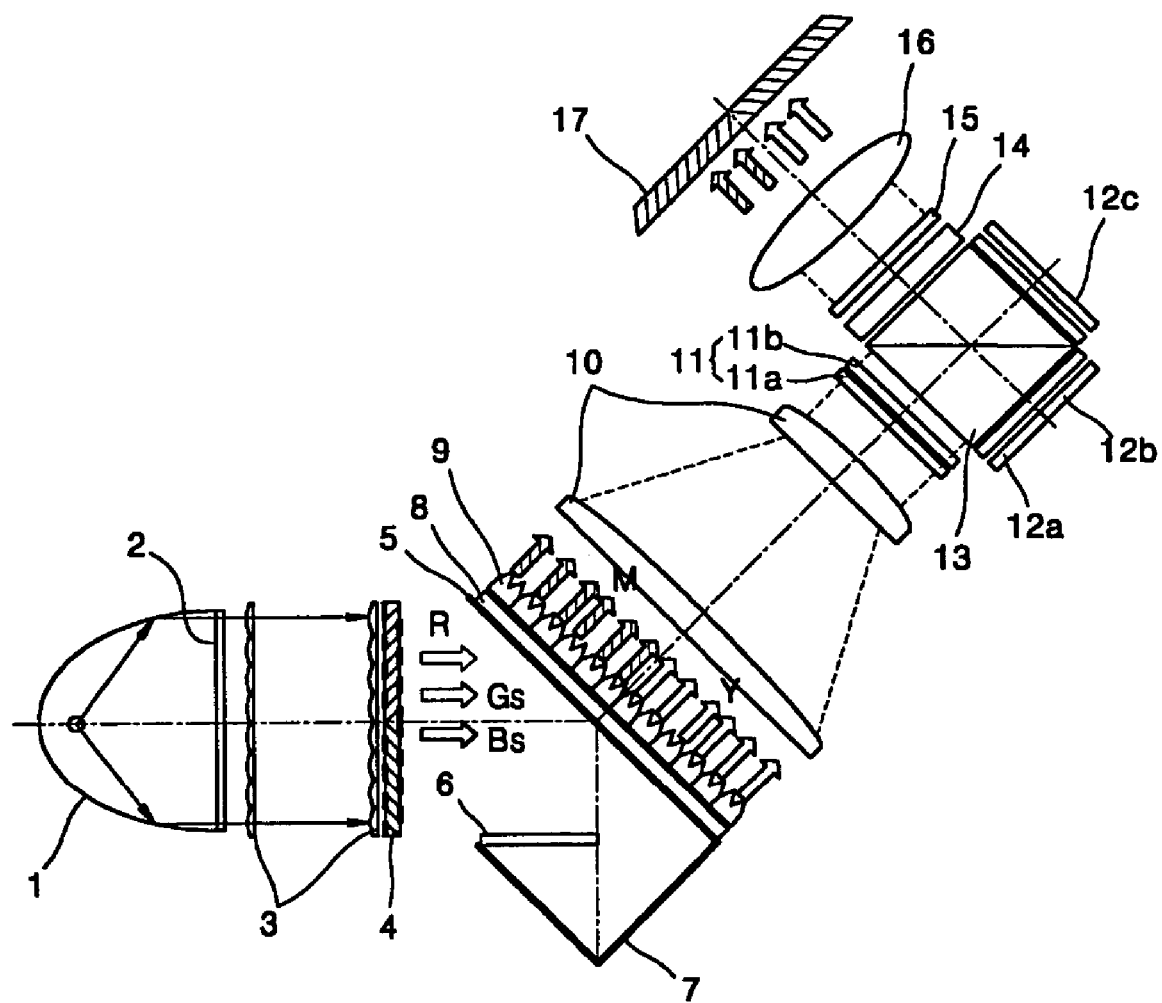
FIG. 2 is a diagram of a projection apparatus according to an embodiment of the present invention.

FIG. 2 is a diagram of a projection apparatus according to an embodiment of the present invention. Referring to FIG. 2, the projection apparatus includes an illumination system, a polarization conversion system, a color recycling system, an image forming system, an optical path conversion system, a projection system, and a screen 17. The illumination system includes a light source 1 and a fly-eye lens integrator 3. The polarization conversion system includes a prism array 4 including a plurality of prisms having interfaces slanting against an optical axis. The color recycling system includes a passive color filter 5, a third color filter 6, a roof mirror 7, a switching color filter 8, and a prism array combiner 9. The image forming system includes first through third reflective panels 12a, 12b, and 12c. The optical path conversion system includes a polarizing beamsplitter 13. The projection system includes a projection lens 16.

The illumination system may have a metal halogen lamp with a parabolic reflector as the light source 1 in order to efficiently collimate white light. In other words, in the metal halogen lamp, an emission source is positioned at a focal point within a range of the parabolic reflector, and light emitted from the emission source is reflected from the inner surface of the parabolic reflector so that light is collimated in one direction.

By disposing the fly-eye lens integrator 3 in a progressing direction of the light emitted from the light source 1, single white light can be separated into multiple sub beams with uniform light intensity. An ultraviolet filter 2 can be further provided on an optical path between the light source 1 and the fly-eye lens integrator 3 in order to block ultraviolet light, thereby increasing the contrast of an image displayed on the screen.

Figure 3A:
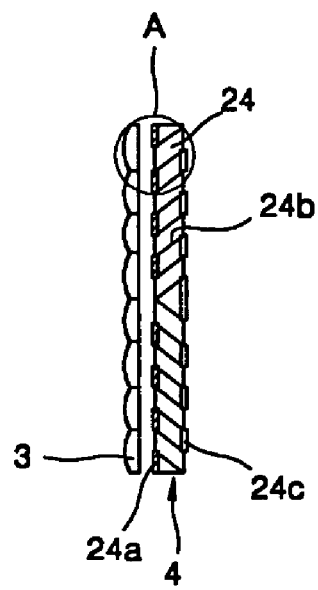
FIG. 3A is a diagram of a polarization conversion system, which is provided in the apparatus of FIG. 2.
Figure 3B:
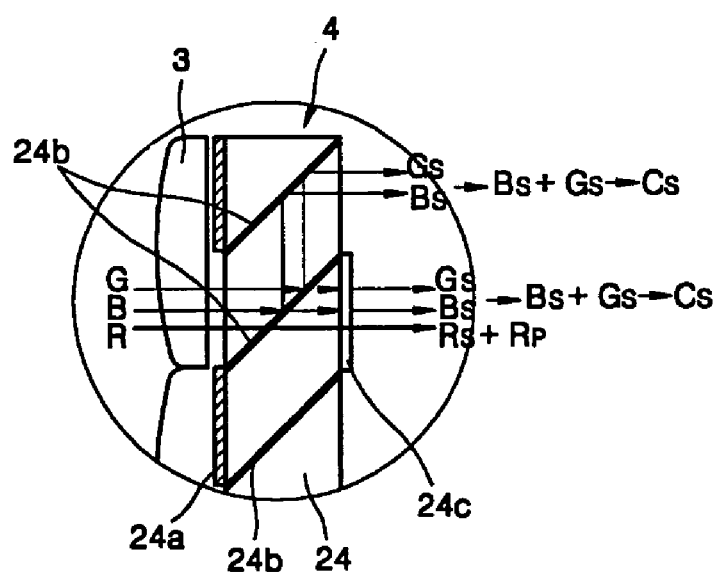
FIG. 3B is an enlarged view of part A shown in FIG. 3A.

FIG. 3A is a schematic diagram of the polarization conversion system, and FIG. 3B is an enlarged view of part A shown in FIG. 3A.

Referring to FIGS. 3A and 3B, the polarization conversion system includes a plurality of prisms 24 having an interface slanting against an optical axis, for example, at an angle of 45 degrees. A cholesteric liquid crystal film 24b is formed on the surface of each of the prisms 24. Blocking masks 24a are arranged on the incident surfaces of every other one of the prisms 24 in a striped pattern, and λ/2 phase plates 24c are arranged on the output surfaces of every other prism 24 such that they correspond to the blocking masks 24a.

The oriented cholesteric liquid crystal film 24b reflects only a single wavelength band corresponding to the pitch of a cholesteric helix. The width of a wavelength band in a reflecting area can be changed by appropriately selecting a liquid crystal. Reflected light is completely changed into circularly polarized light. During circular polarization, the rotational direction of light depends on the rotational direction of the cholesteric helix. Accordingly, the cholesteric liquid crystal film 24b can be formed such that it transmits only one polarization component among P polarization and S polarization and reflects other polarization components. The cholesteric liquid crystal film 24b has no influence on the polarization of light of wavelength bands other than a particular wavelength band changing polarization.

For example, as shown in FIG. 3B, when red (R), green (G), and blue (B) light are incident on the cholesteric liquid crystal film 24b, a cholesteric helix can be formed such that only S polarization components Gs and Bs of light in the green and blue wavelength bands are reflected, P polarization components Gp and Bp of the light are transmitted, and both S and P polarization components of red light are transmitted. The P polarization components Gp and Bp of green and blue light transmitted by the cholesteric liquid crystal film 24b formed on an interface of each prism 24 are converted into the S polarization components by the λ/2 phase plates 24c. Accordingly, the polarization conversion system outputs the S polarization components of green and blue light and outputs red light without polarization.

However, the cholesteric liquid crystal film 24b shown in FIG. 3B is just an illustrative embodiment and can also be formed to reflect the S polarization component of red light and transmit the P polarization component of red light. In this case, the P polarization component of red light is also converted into the S polarization component by the λ/2 phase plates 24c at the output surfaces of the prisms 24. Accordingly, the polarization conversion system outputs the S polarization components of red, green, and blue light.

A cholesteric liquid crystal film theoretically has almost 100% polarization efficiency and is stable to ultraviolet light so that greater than a 150:1 contrast can be achieved under visible light. In addition, a cholesteric liquid crystal film is stable at a high temperature, inexpensive, and can be made of a very stable non-absorbing polymer film which can be formed on a glass substrate, thereby having many advantages in terms of manufacturing.

The projection apparatus according to the embodiment of the present invention does not have a separate optical device for the polarization conversion system. Instead, by simply forming the cholesteric liquid crystal film 24b on an interface of each of the prisms 24 forming the prism array 4, and adjusting the slanting angle of the interface to 45 degrees, only a particular polarization component of incident light is orthogonally reflected by the cholesteric liquid crystal film 24b and then output. In order to output only a particular polarization component, the blocking masks 24a are formed on the incident surface of the prism array 4 in a strip ed pattern. The blocking masks 24a are alternately formed on the incident surfaces of the prisms 24. The λ/2 phase plates 24c are disposed on the output surface of the prisms 24 such that they are located on an optical path of light passing through the incident surface of the prisms 24, on which the blocking masks 24a are not formed. Light output from the polarization conversion system is incident on the color recycling system.

Figure 4:
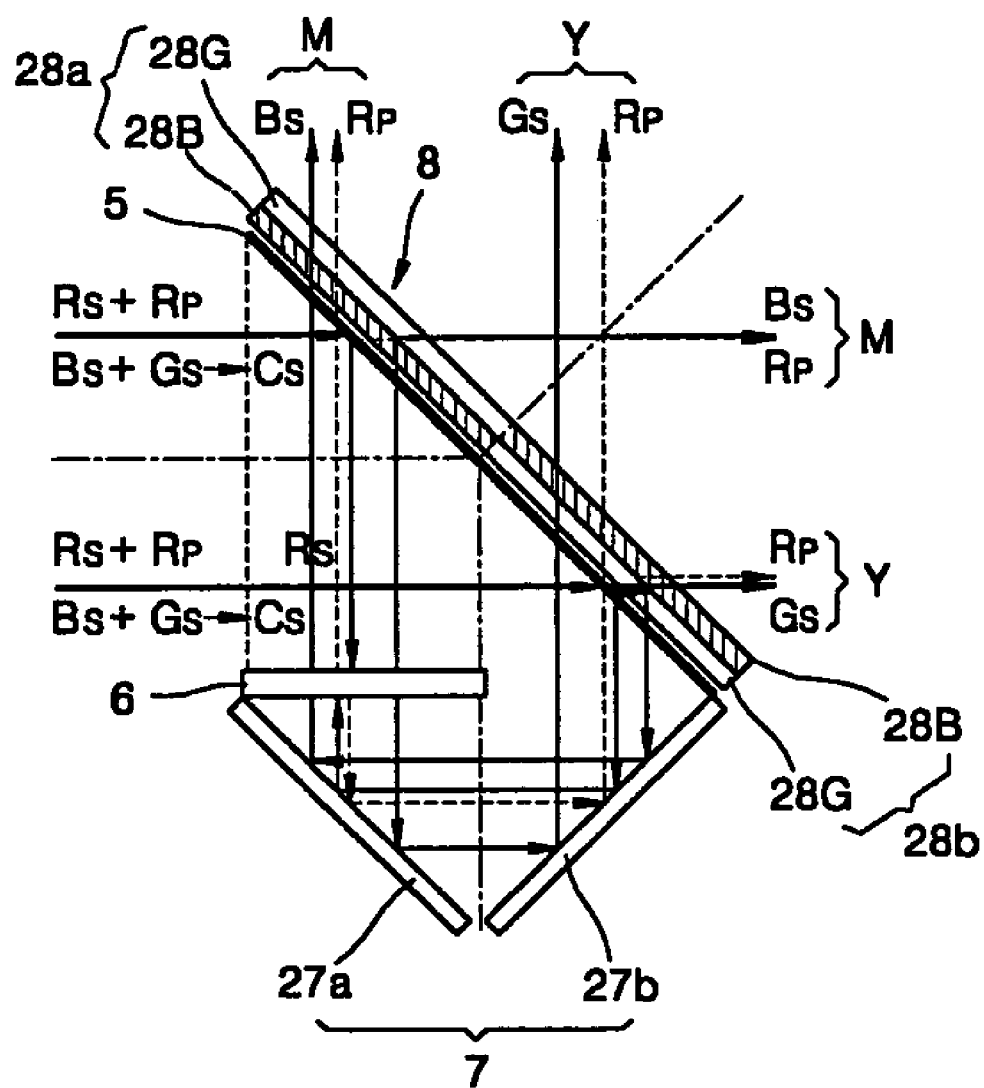
FIG. 4 is a diagram of a color recycling system, which is provided in the apparatus of FIG. 2, except for a prism array combiner.

FIG. 4 is an enlarged view of the color recycling system except for the prism array combiner 9. Referring to FIG. 4, in the color recycling system, the color switching filter 8 includes a first cell 28a and a second cell 28b. Each of the first and second cells 28a and 28b includes a stack of a first filter 28B and a second filter 28G, which transmit or reflect blue light and green light, respectively, according to the supply of power. The first and second filters 28B and 28G are stacked in opposite orders in the first and second cells 28a and 28b. The roof mirror 7 includes a first mirror 27a, which is parallel with the color switching filter 8, and a second mirror 27b, which is perpendicular to the first mirror 27a and the color switching filter 8. The third color filter 6 is disposed on an optical path between the color switching filter 8 and the first mirror 27a. In the embodiment of the present invention shown in FIG. 4, the passive color filter 5, which converts the polarization of red light, is further provided at the incident surface of the color switching filter 8, so that non-polarized red light incident from the polarization conversion system is converted into a particular polarization. However, if the polarization conversion system converts the polarization of red light into S polarization, the passive color filter 5 is not necessary.

In the first cell 28a, the second filter 28G is placed on the first filter 28B, while in the second cell 28b, the first filter 28B is placed on the second filter 28G. When power is simultaneously applied to the first filter 28B of the first cell 28a and the second filter 28G of the second cell 28b, the first and second cells 28a and 28b are simultaneously turned on. Here, the second filter 28G of the first cell 28a and the first filter 28B of the second cell 28b are maintained in an off state. As such, the first and second filters 28B and 28G in each of the first and second cells 28a and 28b are alternately turned on and off.

The first through third filters 28B, 28G, and 6 and the passive color filter 5 are cholesteric filters. The properties of a cholesteric filter are the same as those of the cholesteric liquid crystal films 24b formed on the prism array 4, and thus a description thereof will be omitted.

Non-polarized red light Rs+Rp and the S polarization components Gs and Bs of green and blue light are incident on the passive color filter 5.

The S polarization component Rs of incident red light is reflected by the passive color filter 5 and is directed to the roof mirror 7, and the P polarization component Rp of incident red light is transmitted by the passive color filter 5 and is directed to the color switching filter 8. The S polarization component Rs of red light that is directed to the first mirror 27a of the roof mirror 7 is converted into a P polarization component by the third filter 6, then reflected by the first and second mirrors 27a and 27b, and then directed to the color switching filter 8. The S polarization component Rs of red light that is directed to the second mirror 27b of the roof mirror 7 is sequentially reflected by the second and first mirrors 27b and 27a, then converted into the P polarization component Rp by the third filter 6, and then directed to the color switching filter 8.

If the S polarization component Rs of red light is incident from the polarization conversion system, instead of the passive color filter 5, the third filter 6 is located at the position of the passive color filter 5 so that the S polarization component Rs of red light is converted into the P polarization component Rp. The P polarization component Rp of red light is directed straight ahead by the color switching filter 8.

When in the first cell 28a, the first filter 28B is off while the second filter 28G is on, the S polarization component Bs of blue light incident on the first cell 28a is transmitted to pass straight ahead while the S polarization component Bs of blue light is reflected by the first filter 28B of the first cell 28a to be directed to the roof mirror 7. While the first cell 28a transmits blue light (Bs) and reflects green light (Gs), the second cell 28b transmits green light (Gs) to pass straight ahead and reflects blue light (Bs) to be directed to the roof mirror 7 under a state in which the second filter 28G is off and the first filter 28B is on. Green light (Gs) that is reflected by the first cell 28a toward the roof mirror 7 and blue light (Bs) that is reflected by the second cell 28b toward the roof mirror 7 are reflected by the roof mirror 7 to be directed to the color switching filter 8. Even if green light (Gs) and blue light (Bs) pass through the third filter 6, their polarization states do not change.

Accordingly, the first cell 28a outputs a mixture of the S polarization component Bs of blue light and the P polarization component Rp of red light, i.e., magenta (M) light while the second cell 28b outputs a mixture of the S polarization component Gs of green light and the P polarization component Rp of red light, i.e., yellow (Y) light. Referring back to FIG. 2, magenta and yellow light (M and Y) output from the color switching filter 8 are refracted by the prism array combiner 9 to be separated into different optical paths.

Figure 5A:
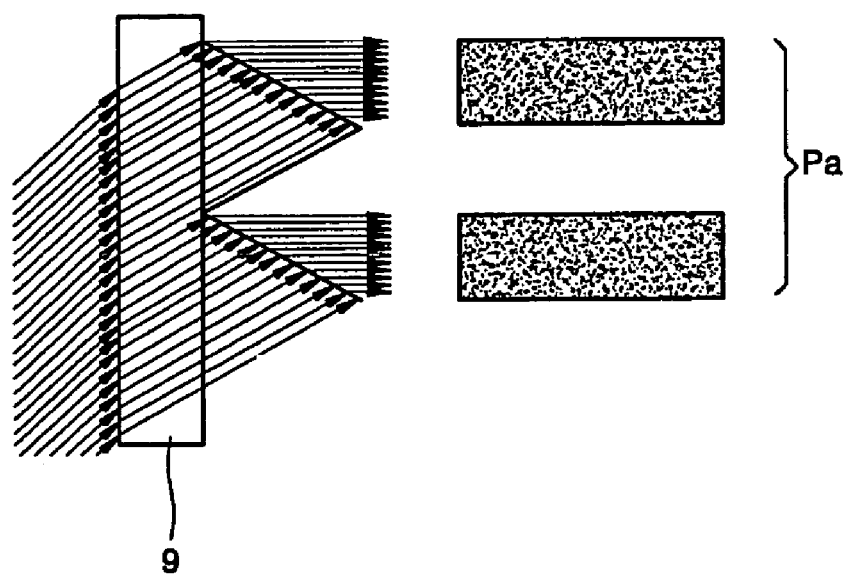
FIG. 5A is a diagram showing an output pattern of light when the light is incident on the prism array combiner in a single direction, according to the embodiment of the present invention.
Figure 5B:
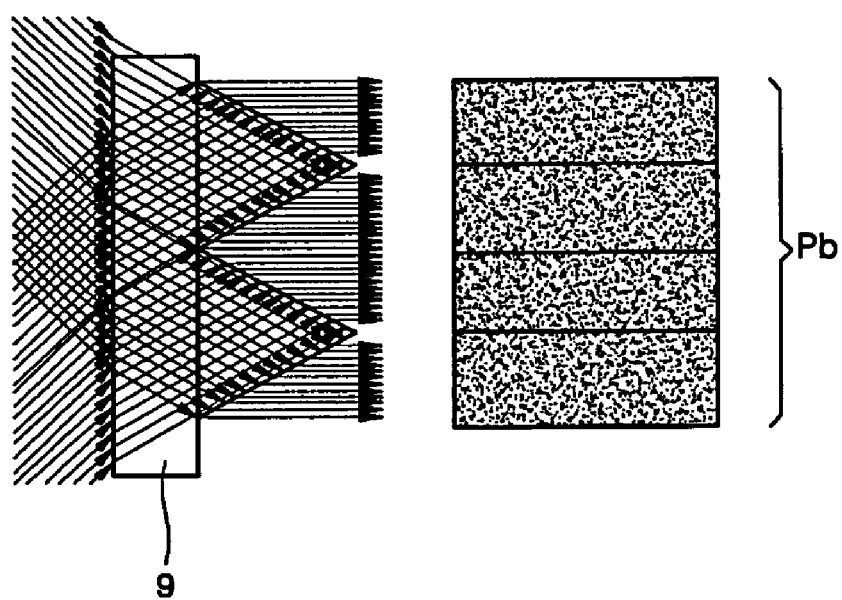
FIG. 5B is a diagram showing an output pattern of light when the light is incident on the prism array combiner in two directions, according to the embodiment of the present invention.

FIGS. 5A and 5B are diagrams showing output patterns of light when the light is incident on the prism array combiner 9 in a single direction and in two directions.

In order to enable red light to be uniformly incident on the third reflective panel 12c shown in FIG. 2, it is necessary that the red light be uniformly incident on the prism array combiner 9 in two directions.

Referring to FIG. 5A, when red light is incident on the prism array combiner 9 in a single direction, the red light is output in a strip ed pattern Pa having blanks, so the light cannot be uniformly incident on the third reflective panel 12c. In contrast, when red light is made to be incident on the prism array combiner 9 in two directions using the color recycling system including the roof mirror 7, as shown in FIG. 5B, the red light is output in a solid pattern Pb with no blanks.

The passive color filter 5 is useful to divide red light into two orthogonal polarization components, direct them to different optical paths, convert them into particular polarization components, and enable the red light to be incident on the prism array combiner 9 in two directions.

The projection apparatus according to this embodiment of the present invention uses the color recycling system in order to reduce loss of light so that most of the light emitted from the light source 1 is directed to the screen 17. Accordingly, the present invention is advantageous by increasing the brightness of displays.

Referring back to FIG. 2, magenta and yellow light (M and Y) output from the color recycling system are shaped by a relay lens system 10. For the light homogenized by the relay lens system 10, a $\lambda/4$ phase plate 11a and a chromatic polarizer 11b are further disposed on an optical path between the relay lens system 10 and the polarizing beamsplitter 13 so that the $\lambda/4$ phase plate 11a converts circularly polarized light into linearly polarized light, and the chromatic polarizer 11b cleans up the incident light by removing parasitic polarization from the linearly polarized light. The phase plate 11a and the polarizer 11b form a polarizer unit 11. The chromatic polarizer 11b includes a liquid crystal polymer (LCP) and linearly photopolymerizable polymer (LPP). The chromatic polarizer 11b transmits linear S polarized green and blue light and P polarized red light and removes parasitic polarization from incident light.

The polarizing beamsplitter 13 of the optical path conversion system directs S polarized blue and green light to the first and second reflective panels 12a and 12b, respectively, and directs P polarized red light to the third reflective panel 12c.

The image forming system includes the first through third reflective panels 12a, 12b, and 12c. In the embodiment shown in FIG. 2, the first reflective panel 12a modulates blue light, the second reflective panel 12b modulates green light, and the third reflective panel 12c modulates red light. The first and second reflective panels 12a and 12b are arranged in a line so that the first reflective panel 12a modulates blue light in the magenta light (M) reflected from an upper transmissive/reflective surface of the polarizing beamsplitter 13 and the second reflective panel 12b modulates green light in the yellow light (Y) reflected from a lower transmissive/reflective surface of the polarizing beamsplitter 13. $\lambda/4$ phase plates 18a and 18b (FIG. 7) are provided between the first through third reflective panels 12a, 12b, and 12c and the polarizing beamsplitter 13 in order to increase the contrast of an image.

In white light emitted from a metal halogen lamp, the amount of red light is smaller than the amount of green or blue light. Accordingly, the first and second reflective panels 12a and 12b respectively modulating green and blue light are made to have a half length of the third reflective panel 12c modulating red light in order to compensate for the shortage of red light to be displayed on the screen 17.

In addition, a shadow zone, which does not reflect light, is formed between the first and second reflective panels 12a and 12b and at the center of the third reflective panel 12c in order to avoid a region, in which blue light incident on the first reflective panel 12a and green light incident on the second reflective panel 12b overlap each other, and to homogeneously radiate blue, green, and red light respectively reflected by the first through third reflective panels 12a, 12b, and 12c.

Figure 6A:
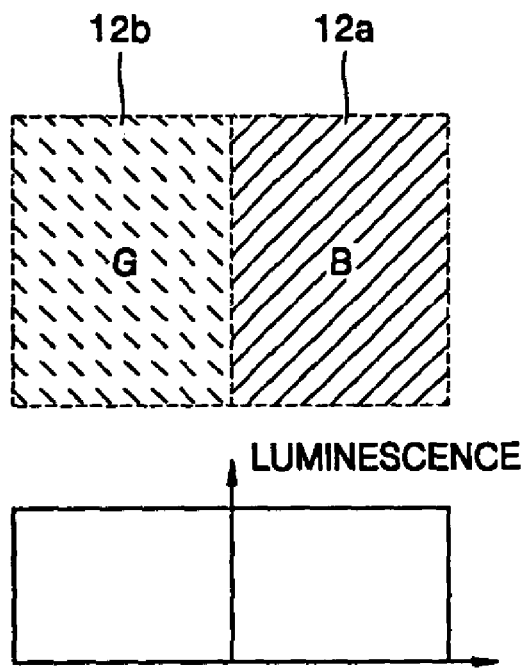
FIG. 6A is a diagram showing the ideal pattern and illuminance of green and blue light incident on respective reflective panels, according to the embodiment of the present invention.

FIG. 6A is a diagram showing the ideal illuminating pattern and illuminance of blue and green light (B and G) respectively illuminating the first and second reflective panels 12a and 12b without an overlapping region. In FIG. 6A, blue light (B) and green light (G) respectively illuminate the first and second reflective panels 12a and 12b without overlapping and at a uniform illuminance.

Figure 6B:
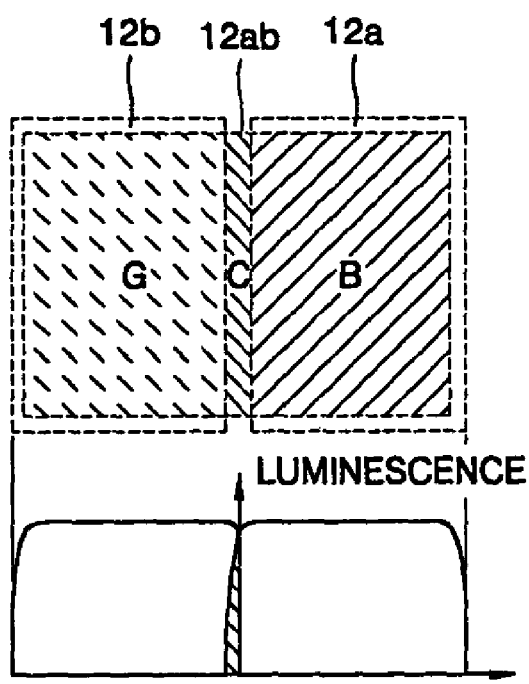
FIG. 6B is a diagram showing the actual pattern and illuminance of green and blue light incident on respective reflective panels, according to the embodiment of the present invention.

FIG. 6B is a diagram showing the actual pattern of blue and green light (B and G) illuminating the respective first and second reflective panels 12a and 12b. Actually, as shown in FIG. 6B, a region 12ab, in which blue and green light overlap each other, exists between the first and second reflective panels 12a and 12b. Cyan (C) appears in the region 12ab in a strip ed pattern. Moreover, illuminance in the first and second reflective panels 12a and 12b decreases a little at their edges.

Figure 9:
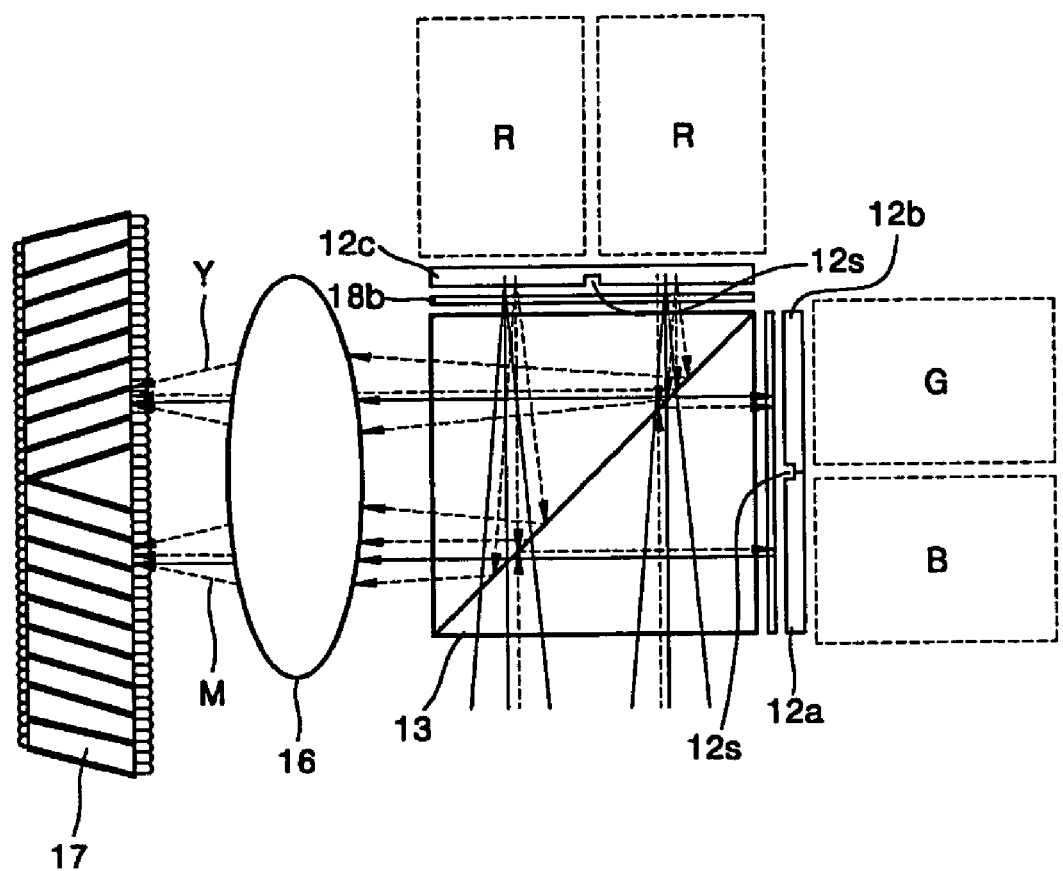
FIG. 9 is a diagram showing an optical path of light, which passes through improved reflective panels, and is directed to the screen of the embodiment of the present invention.

In order to prevent the region 12ab, as shown in FIG. 9, the region 12ab is formed as a shadow zone 12s, in which pixels for optical modulation do not exist. The same shadow zone 12s is formed at the third reflective panel 12c.

Figure 7:
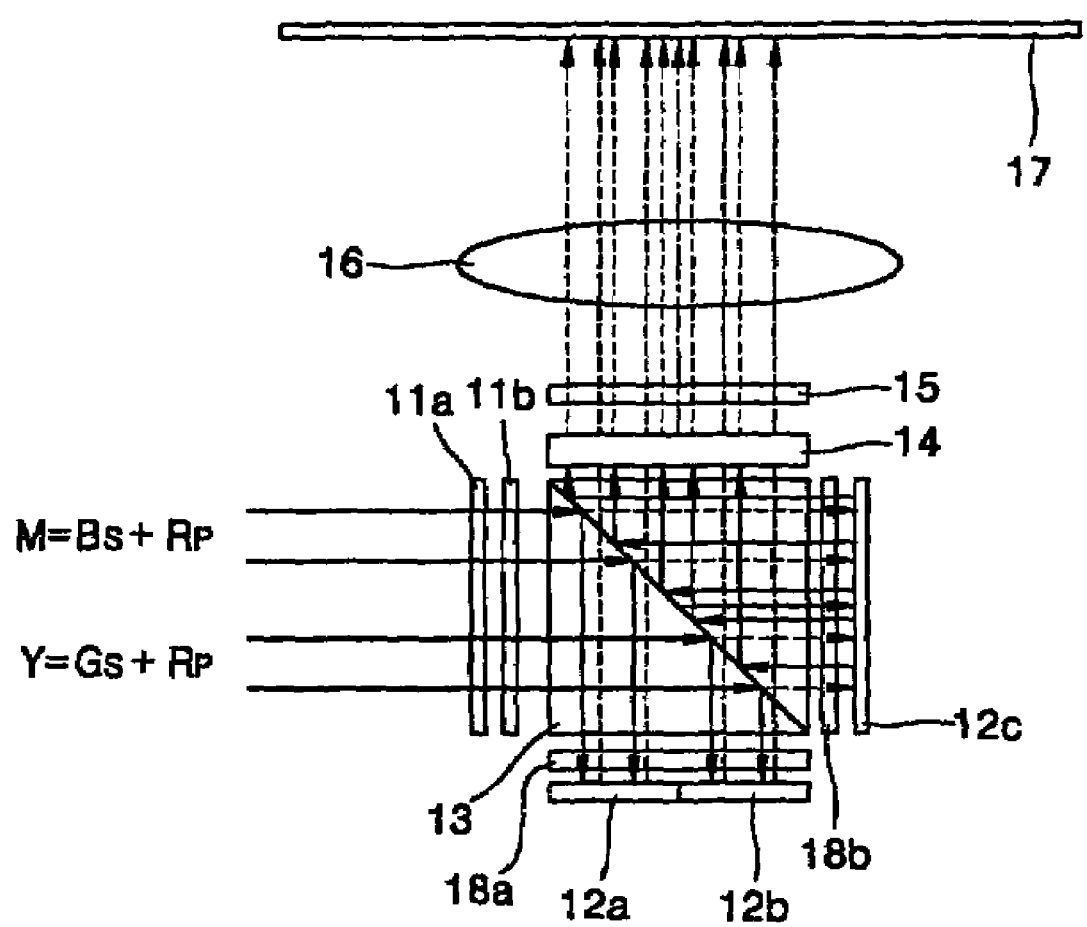
FIG. 7 is a diagram showing an optical path of light incident on a screen via an image forming system, an optical path conversion system, and a projection system, according to the embodiment of the present invention.

FIG. 7 is a detailed diagram showing optical paths of green, blue, and red light, which pass through the optical path conversion system, are then modulated by the image forming system to form an image, and then are directed to the screen 17 via the optical path conversion system and the projection system.

S polarized blue light is reflected from the transmissive/reflective surface of the polarizing beamsplitter 13 to be directed to the first reflective panel 12a, is then modulated by the first reflective panel 12a, and then is directed to the polarizing beamsplitter 13 again. S polarized green light is reflected from the transmissive/reflective surface of the polarizing beamsplitter 13 to be directed to the second reflective panel 12b, then is modulated by the second reflective panel 12b, and is then directed to the polarizing beamsplitter 13 again. P polarized red light is transmitted through the transmissive/reflective surface of the polarizing beamsplitter 13 to be directed to the third reflective panel 12c, then is modulated by the third reflective panel 12c, and is then directed to the polarizing beamsplitter 13 again.

Blue light reflected from the first reflected panel 12a and red light reflected from a lower portion of the third reflective panel 12c pass through the transmissive/reflective surface of the polarizing beamsplitter 13 and form magenta light (M), which progresses to a lower portion of the projection lens 16. Green light reflected from the second reflective panel 12b and red light reflected from an upper portion of the third reflective panel 12c pass through the transmissive/reflective surface of the polarizing beamsplitter 13 and form yellow light (Y), which progresses to an upper portion of the projection lens 16. The yellow and magenta light (Y and M) passing through the projection lens 16 are refracted by the screen 17, which includes a plurality of waveguides, to display a unified image.

The S polarization components Bs and Gs of blue and green light incident on the respective first and second reflective panels 12a and 12b are converted into P polarization components while passing through the λ/4 phase plates 18a twice. The P polarization components of blue and green light pass through the polarizing beamsplitter 13 and progress to the projection lens 16. The P polarization component Rp of red light incident on the third reflective panel 12c is converted into an S polarization component while passing through the λ/4 phase plates 18b twice. The S polarization component of red light passes through the polarizing beamsplitter 13 and is then converted into a P polarization component by a wideband filter 14. A neutral clean-up polarizer 15 is disposed between the wideband filter 14 and the projection lens 16. Accordingly, all of the red, green, and blue lights progressing toward the projection lens 16 are in the P polarization state. In the embodiment of the present invention, by appropriately using polarization conversion optical elements in the polarization conversion system or the color recycling system, the polarization of all of the red, green, and blue lights can be converted into S polarization.

Figure 8A:
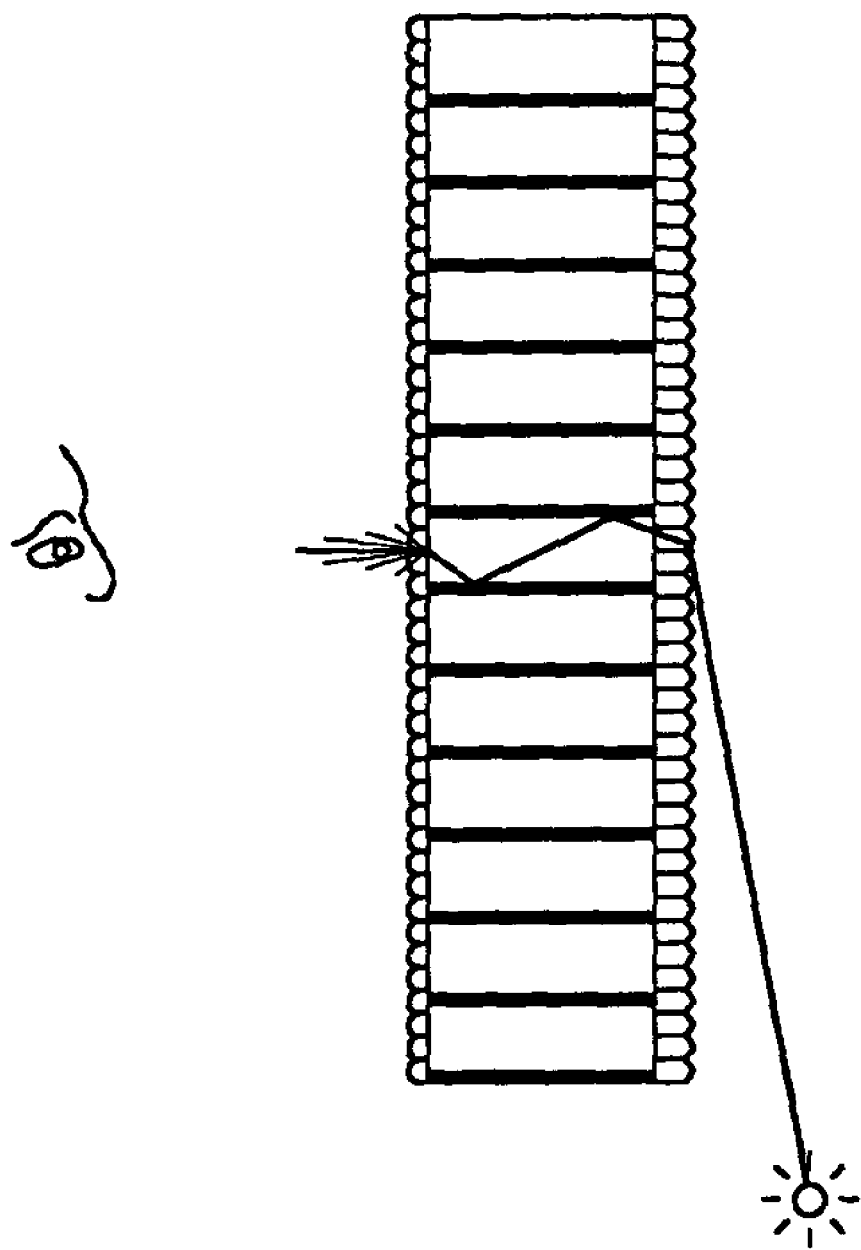
FIG. 8A is a schematic diagram of a conventional screen.
Figure 8B:
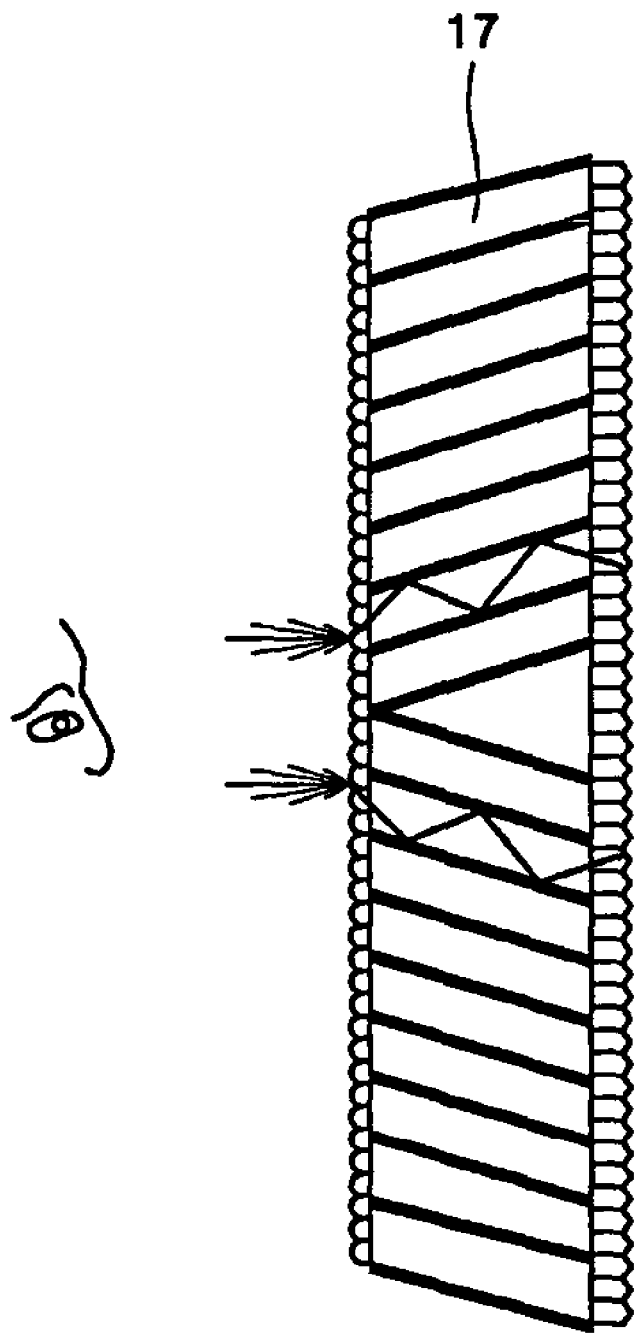
FIG. 8B is a diagram of the screen of the embodiment of the present invention.

FIGS. 8A and 8B respectively show cross-sections of a conventional screen and an improved screen provided in the embodiment of the present invention.

In the projection apparatus according to the embodiment of the present invention, the first and second reflective panels 12a and 12b are arranged in a line at one side of the polarizing beamsplitter 13 so that blue light and green light progress along different paths. Accordingly, in order to combine information on two images and display a unified image on a screen, the screen must have a new structure to change an optical path of yellow light, in which blue and red light are mixed, and an optical path of magenta light, in which green and red light are mixed.

Since the conventional screen shown in FIG. 8A cannot combine yellow and magenta light having different optical paths, the screen 17 having the structure shown in FIG. 8B is made to combine yellow and magenta light into a unified image. In particular, when a reflective panel has a shadow zone, the screen 17 is effective in removing a region in which yellow and magenta light do not progress.

FIG. 9 is a diagram showing optical paths of red, green, and blue light, which pass through the projection lens 16 and are directed to the improved screen 17 after being modulated by the first through third reflective panels 12a, 12b, and 12c in the projection apparatus according to the embodiment of the present invention.

The shadow zone 12s not having pixels is formed between the first and second reflective panels 12a and 12b and the center of the third reflective panel 12c. Thus, red light (R) incident through the polarizing beamsplitter 13 is modulated in two separated regions. Also, green and blue light (G and B) are modulated in two regions separated from each other by a distance of the width of the shadow zone 12s. The blue, green, and red light reflected by the first through third reflective panels 12a through 12c are transmitted by the polarizing beamsplitter 13 and progress to the projection lens 16. Magenta light (M), i.e., a mixture of blue and red light passing through the projection lens 16, and yellow light (Y), i.e., a mixture of green and red light passing through the projection lens 16, are optically guided by the improved screen 17, thereby forming a unified image.

A projection apparatus according to the embodiment of the present invention includes a polarization conversion system and a color recycling system so that an image can be displayed on a screen without losing white light emitted from a light source. Accordingly, the present invention allows an image with high brightness to be displayed. In addition, by using improved reflective panels and a screen, an overlapping area, in which different colors overlap, is removed so that a clear and sharp image can be provided.

Although an embodiment of the present invention has been shown and described, it will be appreciated by those skilled in the art that changes may be made in these embodiments without departing from the principles and spirit of the invention, the scope of which is defined in the claims and their equivalents.

What is claimed is:

1. A projection apparatus comprising:
   an illumination system to emit white light having light of a predetermined wavelength band;

a polarization conversion system, to convert the light of the predetermined wavelength band to a first polarization component;

a color recycling system to separate the light of the predetermined wavelength band into a first color light and a second color light, transmit and reflect the first and second color lights, to convert a third color light to have a second polarization component, and transmit the third color light so that a fourth color light, that is a mixture of the first and third color lights, and a fifth color light, that is a mixture of the second and third color lights, progress in different optical paths;

an image forming system comprising a first reflective panel and a second reflective panel, which respectively modulate the first and second color lights according to an applied image signal, and a third reflective panel, which modulates the third color light according to the applied image signal;

a screen to receive the first through third color lights modulated by the image forming system and projected thereon and display an image;

an optical path conversion system, to split the optical paths of the fourth and fifth color lights incident from the color recycling system such that the first color light in the fourth color light is directed to the first reflective panel, the second color light in the fifth color light is directed to the second reflective panel, and the third color light in the fourth and fifth color light is directed to the third reflective panel, and direct the first through third color lights reflected from the respective first through third reflective panels to the screen; and a projection system comprising a projection lens, which projects the fourth color light output from the optical path conversion system and the fifth color light output from the optical path conversion system on the screen.

2. The projection apparatus of claim 1, wherein the illumination system comprises:

a light source, which emits the white light; and a fly-eye lens integrator, which separates the white light emitted from the light source into sub beams.

3. The projection apparatus of claim 2, wherein the illumination system further comprises an ultraviolet filter on an optical path between the light source and the fly-eye lens integrator in order to block ultraviolet light in the white light.

4. The projection apparatus of claim 1, wherein the polarization conversion system comprises a prism array including a plurality of prisms having interfaces slanting against an optical axis, each of the interfaces being coated with a liquid crystal film, which reflects the first polarization component and transmits the second polarization component.

5. The projection apparatus of claim 4, wherein the polarization conversion system further comprises:

a blocking mask, disposed on the incident surface of every other one of the prisms in order to block light incident thereon; and a λ/2 phase plate, disposed on the output surface of each of the prisms having the blocking mask to convert the second polarization component from a P polarization component to an S polarization component.

6. The projection apparatus of claim 4, wherein interfaces of the plurality of prisms in the prism array slant against the optical axis at an angle of 45 degrees.

7. The projection apparatus of claim 4, wherein the liquid crystal film is a cholesteric film.

8. The projection apparatus of claim 4, wherein the light of the predetermined wavelength band is the first and second color lights, and the liquid crystal film reflects the first polarization components of the first and second color lights and transmits the second polarization components thereof.

9. The projection apparatus of claim 4, wherein the light of the predetermined wavelength band is the first through third color lights, and the liquid crystal film reflects the first polarization components of the first through third color lights and transmits the second polarization components thereof.

10. The projection apparatus of claim 1, wherein the color recycling system comprises:

a color switching filter comprising a first cell and a second cell, including a first color filter and a second color filter stacked in opposite orders in the first and second cells, the first color filter to reflect the first color light in a power-on state and transmit the first color light in a power-off state, the second color filter to reflect the second color light in the power-on state and transmit the second color light in the power-off state, the first and second color filters to transmit the third color light, the color switching filter to direct the fourth color light output from the first cell and the fifth color light output from the second cell to the image forming system;

a roof mirror, to reflect light incident from the color switching filter back to the color switching filter; and a third color filter, positioned on an optical path between the color switching filter and the roof mirror and to convert the first polarization component of the third color light reflected from the color switching filter into the second polarization component.

11. The projection apparatus of claim 10, wherein the color recycling system further comprises a prism array combiner, to refract the fourth and fifth color lights incident from the color switching filter so that the fourth and fifth color lights progress toward the image forming system along different optical paths.

12. The projection apparatus of claim 10, wherein the color recycling system further comprises a passive color filter, which reflects the first polarization component of the third color light and transmits the second polarization component thereof, on an incident surface thereof.

13. The projection apparatus of claim 11, wherein the color recycling system further comprises a passive color filter, which reflects the first polarization component of the third color light and transmits the second polarization component thereof, on an incident surface thereof.

14. The projection apparatus of claim 10, wherein the first through third color filters are cholesteric filters.

15. The projection apparatus of claim 12, wherein the passive color filter is a cholesteric filter.

16. The projection apparatus of claim 13, wherein the passive color filter is a cholesteric filter.

17. The projection apparatus of claim 10, wherein the color switching filter slants against an optical axis at an angle of 45 degrees.

18. The projection apparatus of claim 10, wherein the roof mirror comprises a first mirror parallel with the color switching filter and a second mirror orthogonal to the color switching filter and the first mirror.

19. The projection apparatus of claim 18, wherein the third color filter is disposed on an optical path between the color switching filter and the first mirror.

20. The projection apparatus of claim 1, further comprising a relay lens system, which shapes the fourth and fifth color lights, on an optical path between the color recycling system and the image forming system.

21. The projection apparatus of claim 20, further comprising a λ/4 phase plate on an optical path between the relay lens system and the optical path conversion system.

22. The projection apparatus of claim 21, further comprising a chromatic polarizer on an optical path between the λ/4 phase plate and the image forming system.

23. The projection apparatus of claim 22, wherein the chromatic polarizer is made of a liquid crystal polymer or a linearly photopolymerizable polymer.

24. The projection apparatus of claim 1, wherein the first and second reflective panels are parallel with each other, and the third reflective panel is orthogonal to the first and second reflective panels.

25. The projection apparatus of claim 1, wherein a shadow zone, in which no pixels exist, is formed between the first and second reflective panels and at a center of the third reflective panel.

26. The projection apparatus of claim 1, wherein each of the first through third reflective panels comprises a λ/4 phase plate on an incident surface thereof.

27. The projection apparatus of claim 1, wherein the optical path conversion system comprises a polarizing beamsplitter having a transmissive/reflective surface, to reflect the first color light in the fourth color light incident from the color recycling system to the first reflective panel, reflect the second color light in the fifth color light to the second reflective panel, transmit the first and second color lights modulated by the respective first and second reflective panels to the projection system, transmit the third color light in the fourth and fifth color lights incident from the color recycling system to the third reflective panel, and reflect the third color light modulated by the third reflective panel.

28. The projection apparatus of claim 1, further comprising a wideband filter to convert the first polarization component of the third color light output from the optical path conversion system into the second polarization component, on an optical path between the optical path conversion system and the projection system.

29. The projection apparatus of claim 28, further comprising a clean-up polarizer, which removes a parasitic polarization, on an optical path between the wideband filter and the projection system.

30. The projection apparatus of claim 1, wherein the screen comprises a waveguide array comprising a plurality of waveguides slanting against an optical axis at a predetermined angle which are symmetrically arranged with respect to a center of the screen to refract the fourth and fifth color lights output from the projection system, thereby forming a unified image.

31. The projection apparatus of claim 1, wherein the first color light is blue light and the second color light is green light.

32. The projection apparatus of claim 1, wherein the third color light is red light.

33. The projection apparatus of claim 1, wherein the fourth color light is cyan light and the fifth color light is yellow light.

34. The projection apparatus of claim 1, wherein the first polarization component is an S polarization component and the second polarization component is a P polarization component.

35. The projection apparatus of claim 2, wherein the light source comprises:
a metal halogen lamp; and
a parabolic reflector to collimate the white light.

36. The projection apparatus of claim 4, wherein a width of the wavelength band is determined by the liquid crystal film.

37. The projection apparatus of claim 1, wherein a contrast of the image is 150:1.

38. The projection apparatus of claim 5, wherein the blocking masks are formed on the prisms in a striped pattern.

39. The projection apparatus of claim 1, wherein a length of the first and second reflective panels is half a length of the third panel.

40. The projection apparatus of claim 31, wherein the third color light is red light, the fourth color light is cyan light, and the fifth color light is yellow light.

41. The projection apparatus of claim 40, wherein the screen removes a region in which the yellow and magenta lights do not progress.

* * * * *